United States Patent
Petruszka et al.

(10) Patent No.: US 8,391,642 B1
(45) Date of Patent: Mar. 5, 2013

(54) METHOD AND SYSTEM FOR CREATING A CUSTOM IMAGE

(75) Inventors: Adam Petruszka, Houston, TX (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 12/263,256

(22) Filed: Oct. 31, 2008

Related U.S. Application Data

(60) Provisional application No. 61/052,534, filed on May 12, 2008.

(51) Int. Cl.
  *G06K 9/36* (2006.01)
  *G06K 9/00* (2006.01)
  *G06T 15/00* (2011.01)

(52) U.S. Cl. .......... 382/285; 382/118; 345/419

(58) Field of Classification Search .......... 382/285
See application file for complete search history.

(56) References Cited

U.S. PATENT DOCUMENTS

| | | | |
|---|---|---|---|
| 5,577,179 A * | 11/1996 | Blank | 345/639 |
| 6,181,806 B1 * | 1/2001 | Kado et al. | 382/118 |
| 6,366,316 B1 * | 4/2002 | Parulski et al. | 348/239 |
| 6,556,196 B1 * | 4/2003 | Blanz et al. | 345/419 |
| 6,606,096 B2 * | 8/2003 | Wang | 345/473 |
| 7,440,593 B1 * | 10/2008 | Steinberg et al. | 382/118 |
| 7,643,671 B2 * | 1/2010 | Dong et al. | 382/154 |
| 7,711,155 B1 * | 5/2010 | Sharma et al. | 382/118 |
| 7,859,551 B2 * | 12/2010 | Bulman et al. | 345/630 |
| 2007/0237421 A1 * | 10/2007 | Luo et al. | 382/284 |
| 2007/0258627 A1 * | 11/2007 | Geng | 382/118 |
| 2008/0143854 A1 * | 6/2008 | Steinberg et al. | 348/239 |

* cited by examiner

*Primary Examiner* — David Zarka

(57) ABSTRACT

A method and system for producing an image includes creating an image template having a customizable region and extracting a 2D object from a source image. The 2D object is transformed using a 3D model in response to the customizable region, and the transformed 2D object is merged into the image template to create a customized image.

17 Claims, 4 Drawing Sheets

METHOD AND SYSTEM FOR CREATING A CUSTOM IMAGE

CROSS-REFERENCE TO RELATED APPLICATIONS

This Application claims the benefit of U.S. Provisional patent application Ser. No. 61/052,534, filed May 12, 2008, which is hereby incorporated by reference in it's entirety.

BACKGROUND

Many users desire self-expression and immersive experiences. For example, one area of expression is referred to as "personalized licensed merchandise," where licensed properties such as art, celebrities, fictional characters, sports figures, toys/games, etc. are personalized with users' images or other expressions.

Users' attempts to combine their images with images of favorite characters, actors, sports stars, etc. have often been unsatisfactory. Known photo editing programs, for example, are expensive, complicated to use, require extensive manual effort, and do not support sophisticated 3D models to enable objects to be rotated to the proper orientation. This can make providing such customized offerings at an attractive price point difficult. Other services offer images of characters that can be added to clothing, posters, calendars, mugs, etc. along with customized text, but do not allow the user's image to be combined with the images.

For these and other reasons, there is a need for the present invention.

SUMMARY

A method and system for producing an image are disclosed. Exemplary embodiments include creating an image template having a customizable region and extracting a 2D object from a source image. The 2D object is transformed using a 3D model in response to the customizable region, and the transformed 2D object is merged into the image template to create a customized image.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

A system and method are disclosed that, for example, enable content owners to create region-based templates that users can personalize with their own images and add to various types of merchandise. The systems and methods can be deployed as web services, thus enabling content owners and users to easily customize images.

Figure 1:
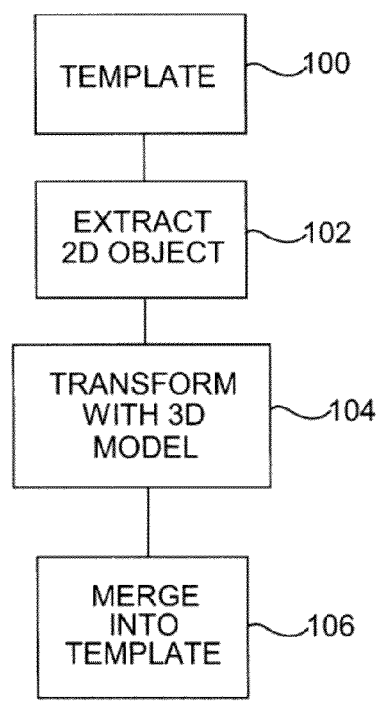
FIG. 1 is a flow diagram conceptually illustrating a process for creating an image in accordance with one or more embodiments of the present invention.

FIG. 1 is a flow diagram illustrating a process for producing a customized image in accordance with disclosed embodiments. An image template is created that includes a customizable region in block 100. In block 102, a 2D object is extracted from a source image. In some embodiments, the source image is a photograph of a person, and the object is the person's face. In other embodiments, images other than a person's face are used as the customizable region and source image object. For example, photographs of articles of clothing could be customized and incorporated into a template image.

In embodiments where customizable region and source images include faces, the template could include an image such as a photograph of a celebrity or character, with a stand-in whose face would be replaced by the user's face. Using processes such as digital matting techniques, the stand-in's face region is identified so that the angular orientation and displaying zoom factor can be determined for the customizable region. The template is typically stored as a file that can include at least some of the following: the staged photograph along with meta-data that describes the facial orientation, the display zoom factor, the lighting conditions, the positions of visible skin regions on the stand-in's body, etc, as well as a bitmap that shows which pixels can be altered.

In some implementations, multiple templates are created. For example, different stand-ins may be used to represent categories for various gender, age, height, weight, etc. Creating multiple templates gives the user an option of choosing a gender and size, for example, that is appropriate to an actual body type.

The source image is provided, for example, from a user via a website that showcases specific licensed content of interest to the user. The user provides the 2D source image, typically a frontal source photograph. The source photograph is used to extract the desired 2D object—the image of the user's face. As illustrated in block 104, the 2D object is transformed using a 3D model. In this way, the extracted object is adjusted in response to the customizable region of the image template. For instance, where the source image is the user's photograph, the user's face image can be scaled and oriented to match that of the template photograph. The transformed 2D object is then merged into the image template to create a composite image in block 106. The composite image can then be formatted to desired merchandise and routed to a merchandise service provider.

Figure 2:
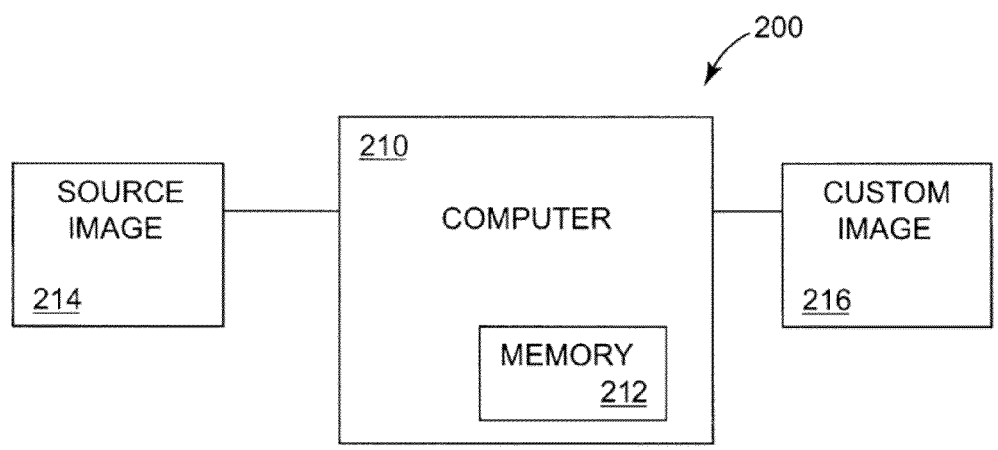
FIG. 2 is a block diagram conceptually illustrating aspects of a system for creating an image in accordance with one or more embodiments of the present invention.

FIG. 2 is a block diagram conceptually illustrating a system 200 for producing a customized image in accordance with embodiments of the disclosed invention. A computer system 210 (which could include a plurality of networked computer systems) has access to a memory 212, such as an integral memory and/or a memory accessible via a network connection, for example. The memory 212 stores an image template with a customizable region. A software program is stored on the memory 212 or on another memory accessible by the computer 210, such that computer 210 is programmed to execute the method described in conjunction with FIG. 1. Accordingly, a 2D object is extracted from a source image 214 corresponding to the customizable region of the image template. As noted above, the source image 214, such as a photograph, can be provided by a user communicating with the computer system 210 via the internet. The 2D object is transformed using a 3D model, and the transformed 2D object is merged into the image template to create a customized image 216.

Figure 3:
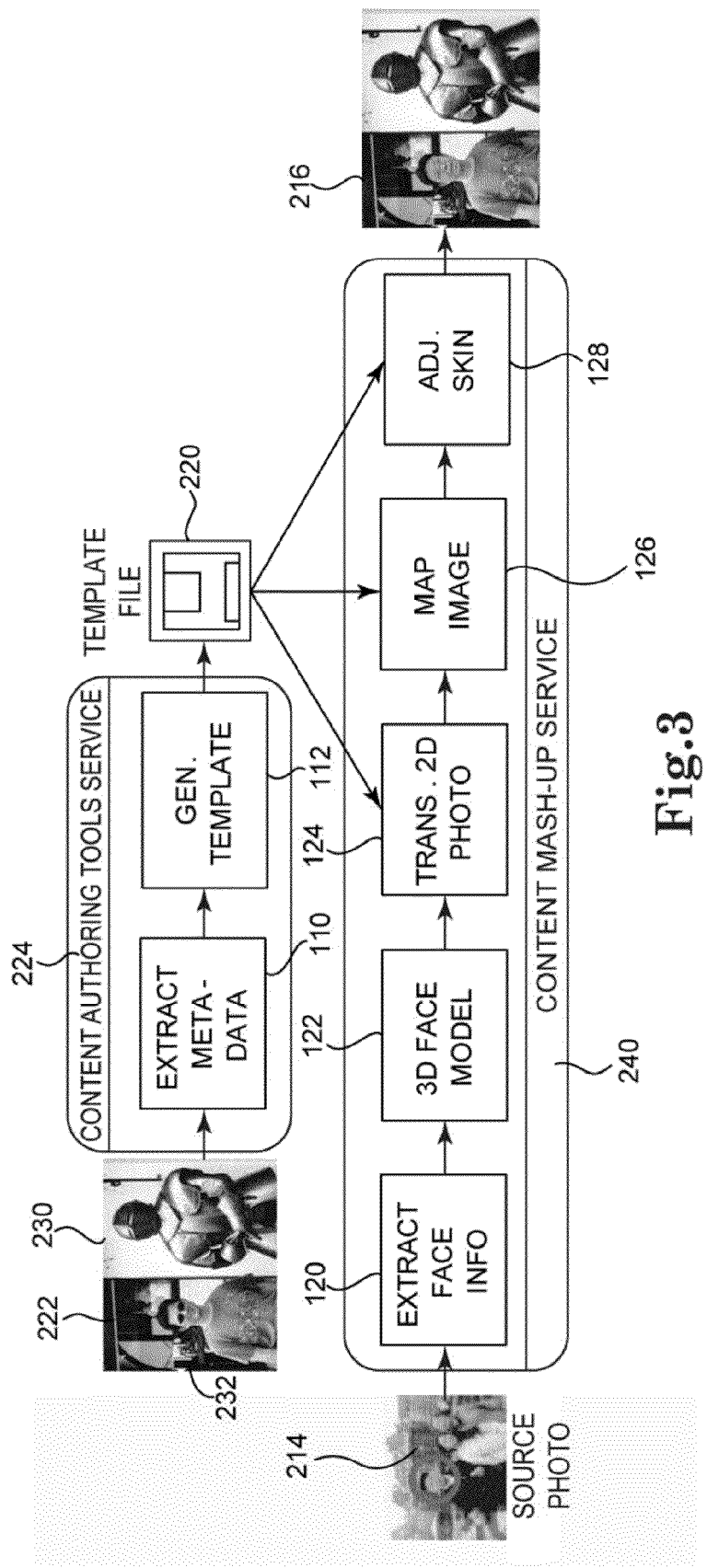
FIG. 3 is a block diagram conceptually illustrating a workflow process for creating an image in accordance with one or more embodiments of the present invention.

FIG. 3 is a flow diagram illustrating an exemplary workflow process in which a photograph of a character is customized to include the image of a user's face. To create the image template 220, a staged photograph 222 is provided to a content authoring process 224. In the illustrated embodiment, the staged photograph includes the character 230 and a stand-in subject 232 whose face will be replaced by a user's face. Thus, the customizable region is the face of the stand-in subject 232. The content authorizing process 224 analyzes the staged photograph 222 to extract meta-data, such as facial orientation, face size, visible skin regions, etc. of the stand in subject 232 in block 110 of the process 224. In block 112, the image template 220 is created by combining the source photograph 222 with the meta-data.

The image template 220 and the source photograph 214 are used by a content "mash-up" or customization process 240 to merge the image of the user's face with the image template 222. The source photograph 214 is provided to the computer 210 that executes the customization process 240, for example, by the user over the internet. In block 120, the source photograph 214 is analyzed and information regarding the object to be extracted—the image of the user's face—is identified. Information such as the facial orientation and facial region are extracted from the source photograph 214. In block 122, the 2D image of the user's face is transformed using a 3D model.

Suitable face detection techniques may be used to identify the face image in the source photograph 214. A 3D morphable model can be used to fit the 2D face target area into a 3D face model. Face features and texture are extracted and mapped to the 3D model. The 3D face model can be used to generate virtual views of the users face in various orientations, and a modified 2D face image is created from the 3D model with a given angular position and size within a certain range. The position and orientation of the light source as well as the ambient intensity are configured to match the lighting conditions found in the staged photograph 214.

Figure 4:
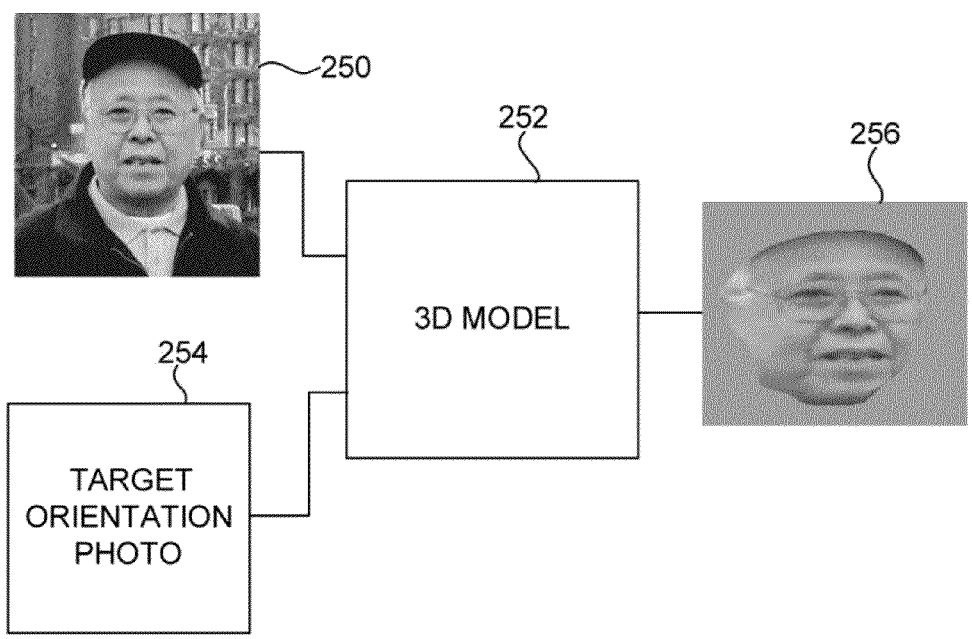
FIG. 4 illustrates transforming a 2D face image using a 3D model in accordance with one or more embodiments of the present invention.

FIG. 4 illustrates an example of the transformation process. The 2D source face object 250 with a first orientation is applied to a 3D face model 252; along with an image of the desired second facial orientation 254 in accordance with the image template. The source 2D object is transformed to the second orientation using the 3D model 252, as shown in image 256.

Several suitable 3D modeling techniques for developing a 3D model for a particular face exist. For example, some techniques use a generic 3D face model with one or more 2D source face images. Several features of the face, such as the eyes, mouth, etc., and the associated locations around key points of the facial features are extracted and fit to the generic model, resulting in a 3D model of the desired face.

One algorithm for identifying such facial features combines techniques known as "coarse-to-fine searching" (face detection) and "global-to-local matching" (feature extraction). A set of multiresolution templates is built for the whole face and individual facial features. A resolution pyramid structure is also established for the input face image. This algorithm first tries to find the rough face location in the image at the lowest resolution by globally matching it with the face templates. The higher resolution images and templates are used to refine the face location. Then each facial feature is located using a combination of techniques, including image processing, template matching and deformable templates. Finally, a feedback procedure is provided to verify extracted features using the anthropometry of human faces and if necessary, the features will be rematched.

Another suitable process involves providing several generic 3D face models, and one of the 3D models is selected based on similarity to the source face image. For example, 2D positions (x and y coordinates) of predetermined facial feature points are extracted from the source image. The z coordinates of the points are estimated and the most similar model is retrieved based on geometrical measurements. Once the appropriate 3D model has been selected, the facial features extracted from the source image are mapped to the 3D model to produce the 3D model of the source face. Using this 3D model, the source 2D image is transformed in response to the image template.

Referring to FIG. 3, the generation of the transformed 2D source image with the desired orientation, size, etc. is illustrated in block 124. In block 126, the transformed 2D image is mapped to the customizable region of the image template, and in block 128, other areas of visible skin in the image template are adjusted to match the skin tones of the transformed face image.

Figure 5:
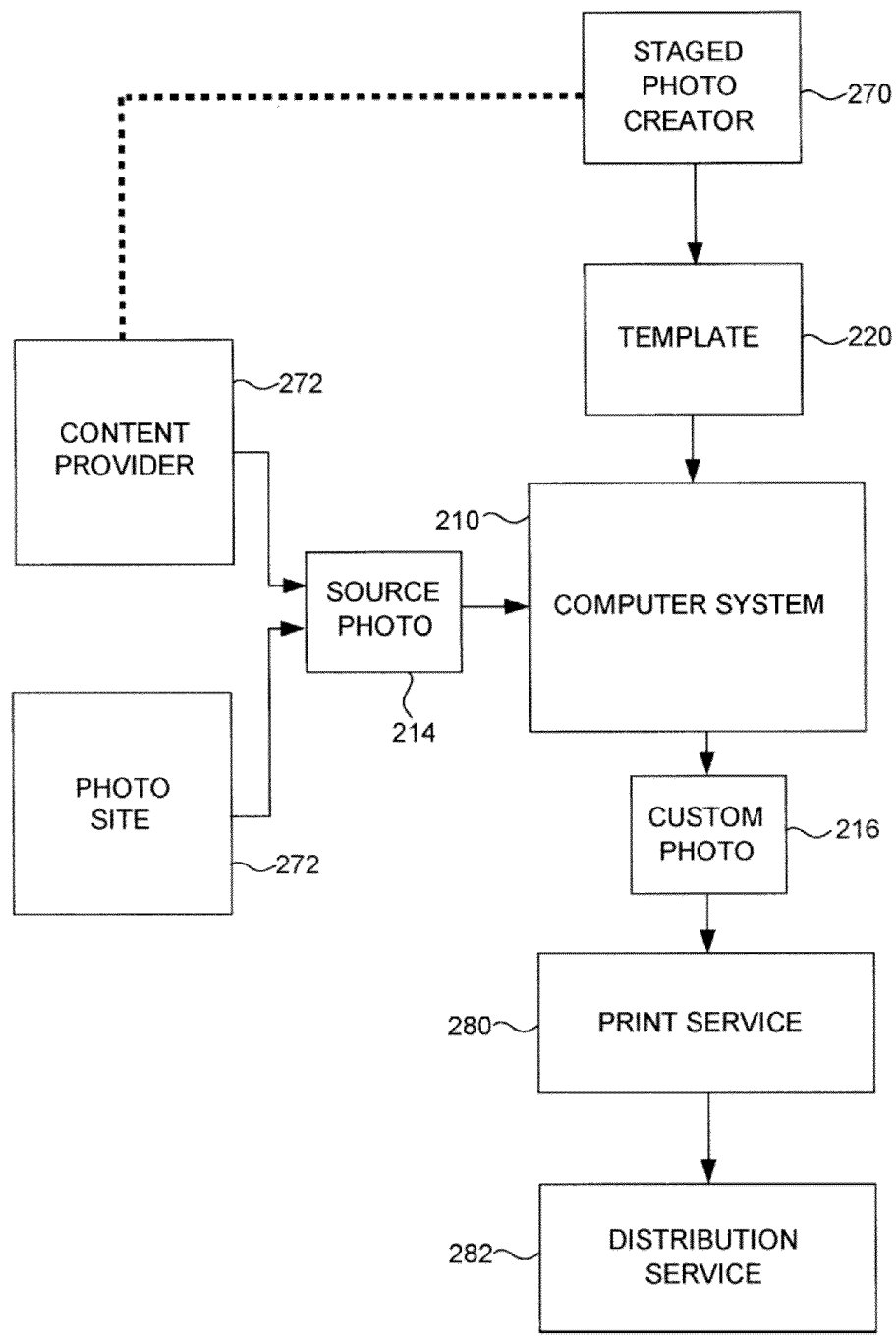
FIG. 5 is a block diagram illustrating a system overview for an image customization process in accordance with one or more embodiments of the present invention.

FIG. 5 illustrates an example of a system overview for the image customization process. A staged photograph creator 270 provides the image template 220 to the computer system 210 providing the customization services. Users access content provider or photograph services websites 272 to select the desired image templates and upload their source photographs 214, which are provided to the customization services system 210. The user's image is transformed and merged with the template image as disclosed herein. The customized image 216 can then be sent to print service providers 280 for customizing the desired article, such as a clothing article, souvenir item, etc., and shipped to the user via desired distribution services 282.

Applications for the customized images include personalized children's storybooks where the child's face is merged into stories with their favorite live or cartoon characters, and clothing, posters, mousepads, etc. that combine images of users' faces with their favorite music, TV, and sports celebrities.

In some implementations, attributes of the object image from the source image in addition to the orientation and size of the object such as a face are changed. One example is a personalized a children's story book. If the storybook has a certain drawing style, such as cartoon style, it is desirable to make the object image to be processed and converted to the cartoon style also. The process for doing this includes analyzing the style of the staged photo in terms of color and texture. If the staged photo is black and white, the object image to be merged also needs to be converted to black and white. If the staged photo has small color variations, then the color variations in the object image also needs to be reduced. This analysis process can be done after the orientation and size of the template is computed and stored as meta-date (for example, block 110 of FIG. 3). The processing of the object image can be done as part of the transformation process represented in block 124 of FIG. 3.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for producing an image, comprising:
    creating an image template having a customizable region including an image of a face;
    extracting a 2D object from a source image, including identifying a face in the source image and extracting features of the identified face;
    creating a 3D model of the extracted 2D object, including fitting the extracted features to a 3D face model;
    manipulating the 3D model in response to the customizable region to transform the extracted 2D object to a modified 2D object, including generating a plurality of virtual views of the extracted face in various orientations such that the modified 2D object is a reoriented image of the identified face having an angular position based on the customizable region; and
    merging the transformed 2D object into the image template by a computer processor to create a customized image.

2. The method of claim 1, wherein creating the image template includes analyzing a staged image.

3. The method of claim 1, wherein creating the 3D model includes:
    providing a plurality of generic 3D face models;
    selecting one of the generic 3D face models based on the source image; and applying the extracted features to the selected 3D face model.

4. The method of claim 1, wherein creating the image template includes identifying visible skin regions, and wherein merging the transformed 2D image includes adjusting the visible skin regions to match skin tones of the image of the face in the source image.

5. The method of claim 1, wherein creating the image template includes analyzing a staged image.

6. The method of claim 5, wherein analyzing the staged image includes extracting meta-data regarding the customizable region.

7. The method of claim 1, wherein creating the image template includes receiving a staged image.

8. The method of claim 1, further comprising receiving the source image.

9. The method of claim 1, further comprising printing the customized image.

10. The method of claim 1, wherein fitting the extracted features includes fitting the extracted features to a 3D morphable model.

11. A system for customizing an image, comprising:
    a computer system;
    a memory accessible by the computer system storing an image template having a customizable region, wherein the customizable region includes an image of a face;
    wherein the computer system is operable to:
        identify a face in a source image;
        extract a 2D object including the identified face from the source image corresponding to the customizable region;
        extract features of the identified face;
        create a 3D face model of the extracted 2D object;
        fit the extracted features to the 3D face model;
        manipulate the 3D face model in response to the customizable region to transform the extracted 2D object to a modified 2D object, including generating a plurality of virtual views of the extracted face in various orientations such that the modified 2D object is a reoriented image of the identified face having an angular position based on the customizable region; and
        merge the transformed 2D object into the image template to create a customized image.

12. The system of claim 11, wherein the memory is integral to the computer system.

13. The system of claim 11, wherein the computer system is operable to identify visible skin regions in the image template and adjust the visible skin regions to match skin tones of the image of the face.

14. The system of claim 11, wherein the computer system is operable to analyze a staged image to create the image template.

15. The system of claim 11, further comprising a printer for receiving and printing the customized image.

16. A system for customizing an image, comprising:
    a computer system;
    a memory accessible by the computer system storing an image template having a customizable region, wherein the customizable region includes an image of a face;
    wherein the computer system is operable to:
        identify a face in a source image;
        extract a 2D object including the identified face from the source image corresponding to the customizable region;
        extract features of the identified face;
        create a 3D face model of the extracted 2D object, including selecting one generic 3D face model from a plurality generic 3D face models based on the source image, and apply the extracted features to the selected 3D face model;
        manipulate the 3D face model in response to the customizable region to transform the extracted 2D object to a modified 2D object, including generating a plurality of virtual views of the extracted face in various orientations such that the modified 2D object is a reoriented image of the identified face having an angular position based on the customizable region; and
    merge the transformed 2D object into the image template to create a customized image.

17. A machine readable medium storing a software program that when executed performs a method comprising:
    creating an image template having a customizable region including an image of a face;
    extracting a 2D object from a source image, including identifying a face in the source image and extracting features of the identified face;
    creating a 3D face model of the extracted 2D object, including
        providing a plurality of generic 3D face models;
        selecting one of the generic 3D face models based on the source image; and
        applying the extracted features to the selected 3D face model;
    manipulating the 3D model in response to the customizable region to transform the extracted 2D object to a modified 2D object, including generating a plurality of virtual views of the extracted face in various orientations such that the modified 2D object is a reoriented image of the identified face having an angular position based on the customizable region; and merging the transformed 2D object into the image template to create a customized image.

* * * * *